United States Patent [19]

Clark et al.

[11] 4,214,381
[45] Jul. 29, 1980

[54] RESPONSE EVALUATION MODULE FOR TEACHING DRIVER TRAINING

[75] Inventors: George H. Clark; Mary A. Clark, both of Carlsbad, Calif.

[73] Assignee: Rescorp, Carlsbad, Calif.

[21] Appl. No.: 959,729

[22] Filed: Nov. 13, 1978

[51] Int. Cl.² ............................................. G09B 9/04
[52] U.S. Cl. ................................................... 35/11 R
[58] Field of Search ................................ 35/11, 12 N

[56] References Cited

U.S. PATENT DOCUMENTS

| 2,091,154 | 8/1937 | Matzner | 35/11 R |
| 2,353,213 | 7/1944 | Bennett | 35/11 R |
| 2,623,302 | 12/1952 | Shields | 35/11 R |
| 3,686,776 | 8/1972 | Dahl | 35/11 R |
| 3,758,714 | 9/1973 | Herndon | 35/12 N |

*Primary Examiner*—John W. Shepperd
*Attorney, Agent, or Firm*—John H. Widdowson

[57] ABSTRACT

A response evaluation module for teaching driver training. The module teaching and evaluating student response during various simulated driving conditions. The module designed to help the driver develop good defensive driving habits.

8 Claims, 7 Drawing Figures

RESPONSE EVALUATION MODULE FOR TEACHING DRIVER TRAINING

BACKGROUND OF THE INVENTION

This invention relates generally to driver training and more particularly, but not by way of limitation, to a response evaluation module for simulating actual driving conditions and monitoring the response of the student driver during the training.

Heretofore there have been various types of automobile driver trainers, aircraft simulator trainers, and ship navigational simulators. These training devices have included various types of visual display systems for simulating different driving conditions.

None of the prior art simulating devices provide the novel structure and advantages of the subject invention as described herein.

SUMMARY OF THE INVENTION

The subject invention is designed to help the driver of a vehicle develop good defensive driving habits. The invention may be used not only for teaching automobile and truck drivers but may also be used equally well for motorcycle drivers, bus drivers, and drivers of various other types and sizes of vehicles.

The module is designed to detect tendencies of overcautiousness in drivers, and through the use of a computer, to advise the driver and instructor of these tendencies and assist the driver in learning proper ways of correcting these habits.

The module is also designed to measure the student's reaction due to mechanical failure of the vehicle, overdriving of the vehicle, tailgating, failure to frequently scan rear and side view mirrors, the effects of speeding and emergency situations, and the ability to estimate distances and time to apply brakes.

The module provides a vehicle which will respond to different dangerous road conditions such as wet and icy road conditions, hydroplaning, flat tire and blow out at different speeds, rough and bumpy roads, and other types of road conditions.

The module exposes the student to inclement weather conditions, various passing conditions, emergency stopping, turns, night driving and drowsiness conditions, and other situations that arise during the driving of a vehicle on a roadway.

The response evaluation module for teaching driver training includes a vehicle having standard automotive equipment. The vehicle is mounted on a pair of parallel roadway belts which receive the wheels of the vehicle thereon and simulate the driving of the vehicle on a roadway. Attached to the bottom of the vehicle is a telescoping notocord for providing forward and backward movement of the vehicle on the roadway belts and lateral movement on the belts. This movement allows simulation of fish tailing, sliding, skidding, and hydroplaning of the vehicle on the roadway belts. A dome surrounds the vehicle and provides a hemisphere screen for showing landscape surrounding the vehicle and simulating actual road conditions as the vehicle is driven on the roadway belts.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
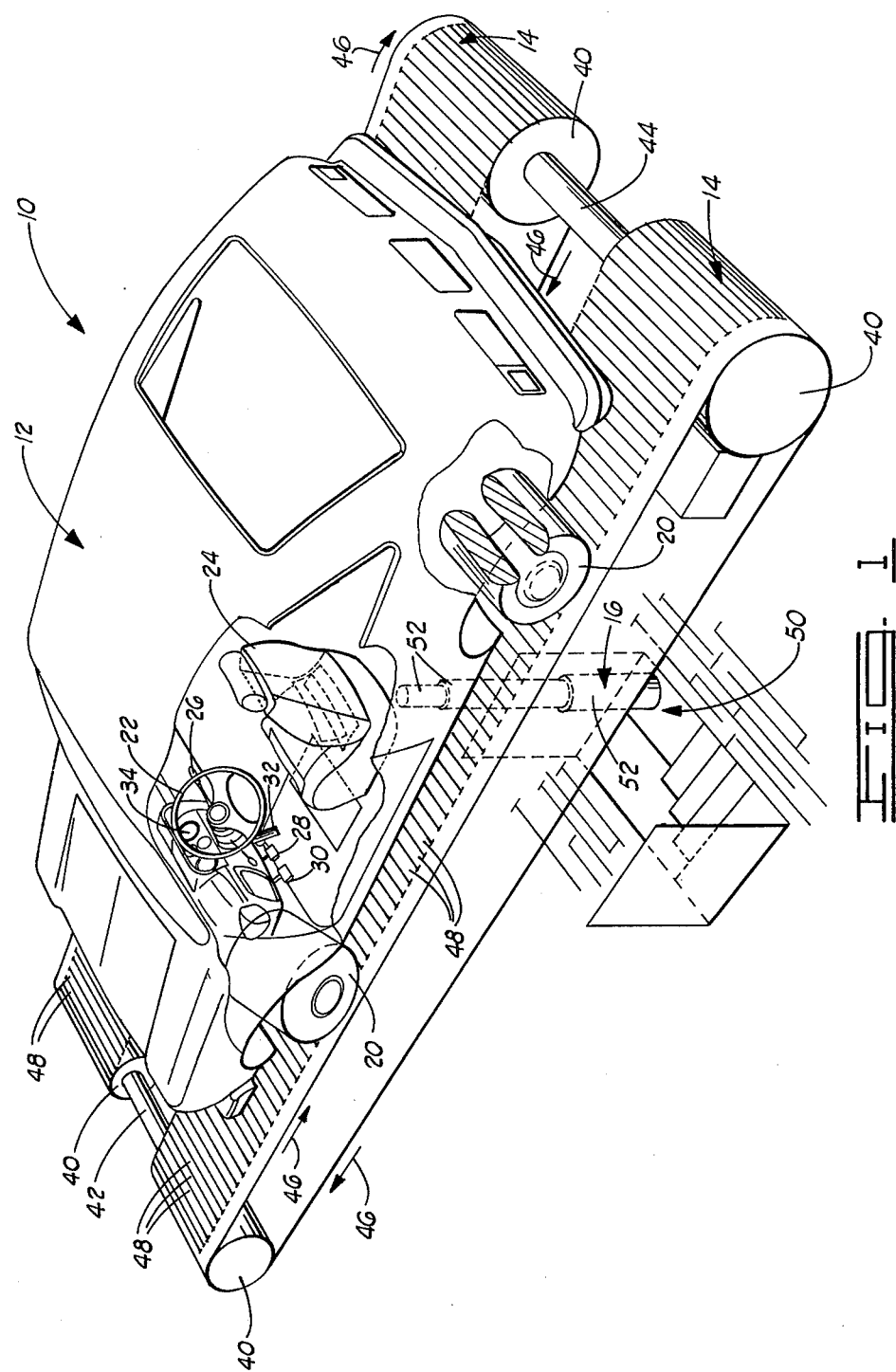
In FIG. 1, the driver training vehicle is shown in a perspective view mounted on parallel roadway belts.
Figure 7:
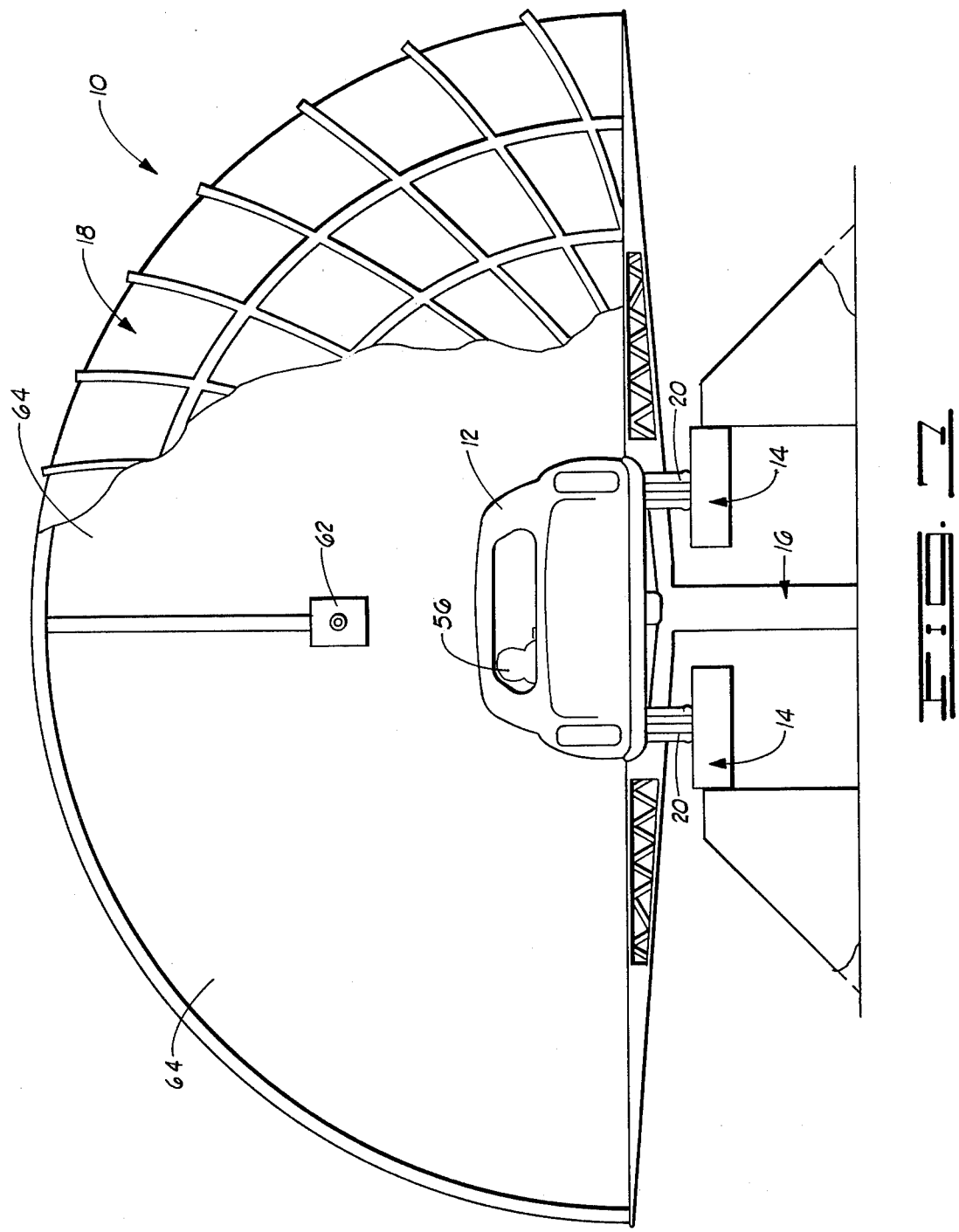
FIG. 7 illustrates a rear view of the dome surrounding the vehicle.

In FIG. 1, the response evaluation module is designated by general reference numeral 10. The module 10 includes a vehicle 12, a pair of roadway belts 14, a telescoping notocord 16, and a dome 18 which is shown in FIG. 7.

The vehicle 12 includes standard automotive equipment except for enlarged air bag type tires 20 which are enlarged in width to correspond with the width of the belts 14 and provide for rapid deflation to depict a blow out or flat tire.

The vehicle 12 can be seen having a steering wheel 22, a driver seat 24, a gear shift 26, brakes 28, a clutch pedal 30, an accelerator pedal 32, and a standard automotive dash having a speedometer 34. The controls of the vehicle 12 are wired to a computer which is mounted in a monitor console 36 shown in FIG. 2. The vehicle 12 also includes an engine which is not shown that drives the vehicle 12 at various speeds on top of the roadway belts 14.

The parallel roadway belts 14 are mounted at each end to belt drums 40. The drums 40 attached to the roadway belts 14 and positioned in front of the vehicle 12 are attached to an idle shaft 42. The ends of the belts 14 at the rear of the vehicle 12 are attached to a drive shaft 44 which in turn is attached in any suitable manner such as by common gearing to a usual and suitable electric or hydraulic drive motor which is not shown in the drawings. The direction of the belts 14 is indicated by arrows 46. It should be noted that the belts 14 are driven by the drive motor in an opposite direction to the direction of travel of the vehicle 12. By driving the vehicle 12 forward on the belts 14, actual roadway conditions are simulated. The belts 14 are made up of a plurality of parallel belt sections 48 which are discussed under FIG. 5.

Also shown in FIG. 1 is a service area 50 below the vehicle 12 and belts 14 which is used for servicing the vehicle 12, the belts 14, and the notocord 16.

The notocord 16 is pivotally mounted on the floor 50 by any suitable means such as with a U-joint and bolts, and includes a plurality of hollow telescoping sections 52 which are either hydraulically or electrically driven in any suitable and common manner to position same and provide restricted movement of the vehicle 12 in both a forward and backward direction along with lateral movement of the vehicle 12 on the belts 14.

Figure 2:
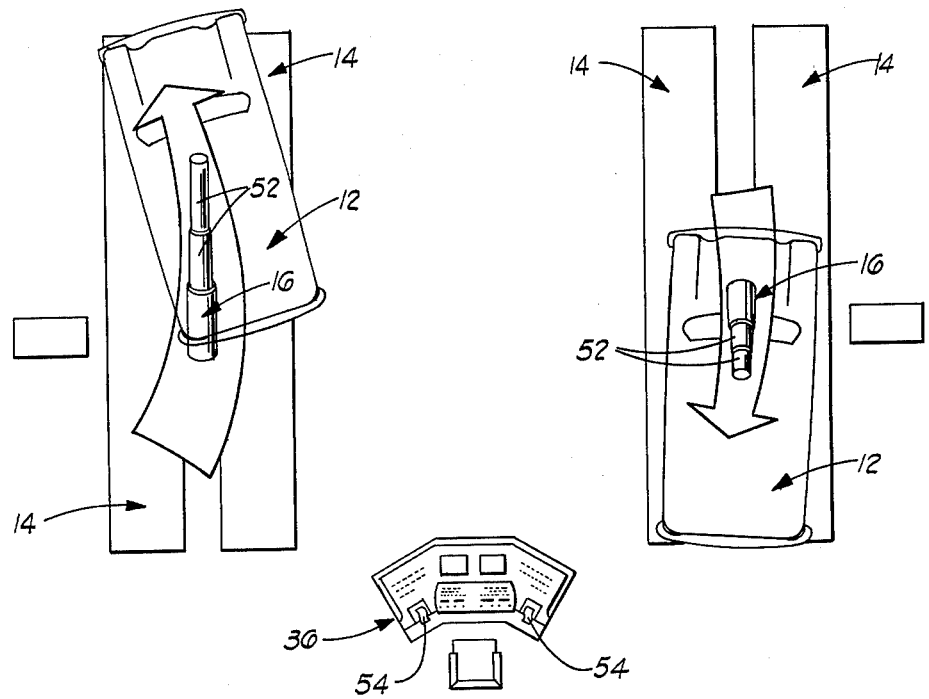
FIG. 2 illustrates a monitor console having print-out material for reading the response of the student to driving conditions. Also shown is the vehicle attached to a notocord and depicting the vehicle fish tailing and sliding backward.

In FIG. 2, a front view of the console 36 is shown having printouts 54 which are used for monitoring the reactions of the student driver in the vehicle 12. The console 36 includes a standard computer which is wired to the vehicle 12.

Also shown in FIG. 2 is the vehicle 12 with the rear of the vehicle fish tailing to the right. Also shown is the notocord 16 attached to the bottom of the vehicle 12 in any suitable and common manner such as by a U-joint and bolts to limit movement of the car forward and backward and left and right as in a skid, and telescoped in a forward direction.

Again, shown in FIG. 2 is the vehicle 12 with the notocord 16 moved in a backward position providing the simulation of the vehicle 12 sliding backward and to the left. Through the use of the telescoping notocord 16, the actual simulation of fish tailing, skidding, sliding, hydroplaning, and various movements of the vehicle 12 are depicted on the rotating belts 14. As a result of pull by the car, the notocord telescopes in operation, and this pull is created as the speed of the car wheels increases and the car tries to move forward and leave runners or belts 14. Notocord 16 keeps the car from running off the track when skidding, etc., takes place.

Figure 3:
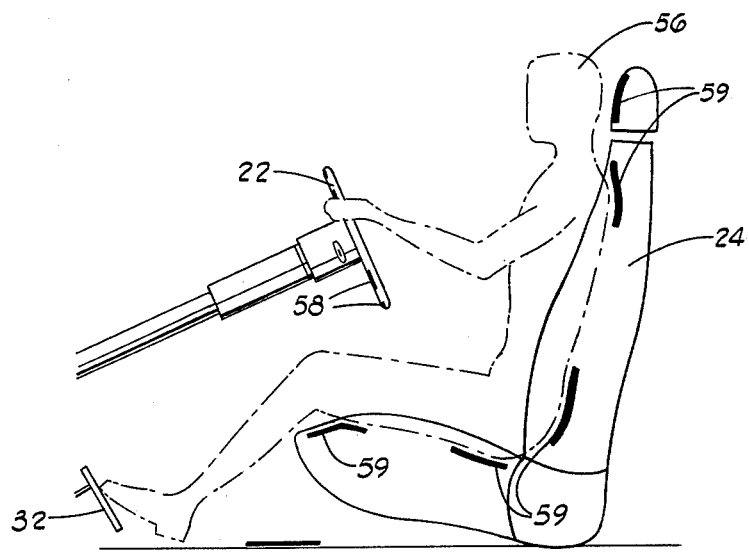
FIG. 3 is a side view of the driver seat having pressure sensors mounted thereon.

In FIG. 3, a side view of the seat 24 is illustrated with the student driver 56 depicted in dotted lines and gripping the steering wheel 22. The steering wheel 22 includes pressure sensors 58 and the seat 24 includes pressure sensors 59 which are used for determining the grip pressure applied to the seat 24 during various conditions when driving the vehicle 12. The sensors 58 and 59 are wired to the computer in the console 36 in any suitable and common manner for determining the amount of pressure applied thereto.

Figure 4:
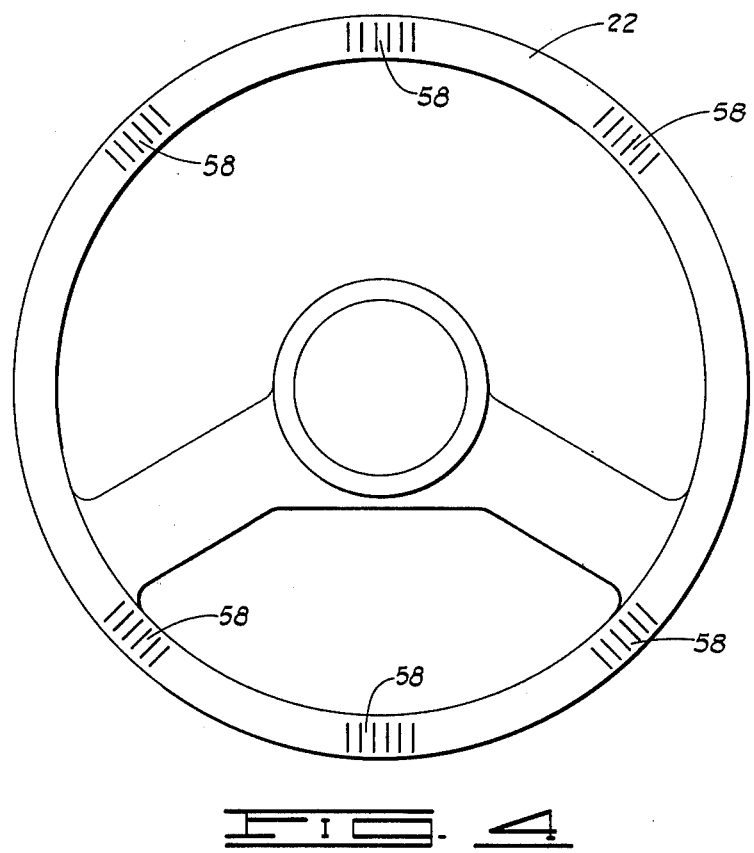
FIG. 4 illustrates a standard steering wheel having pressure sensors mounted thereon.

In FIG. 4, a front view of the steering wheel 22 is depicted with the pressure sensors 58 mounted around the wheel 22. Not only are the pressure sensors 58 wired to the computer, but they are also wired to the ignition of the vehicle 12 and sound an alarm which is not shown in the drawings should the student fail to grip the wheel properly prior to starting the vehicle 12. The pressure sensors 58 are disposed around the wheel 22 and are designed to teach the proper grip position on the wheel wherein the driver grips the wheel with both hands and the proper pressure is applied thereto. By measuring the amount of pressure applied to the pressure sensors on the wheel 22, it can be determined whether the student is gripping the wheel properly or if too little or too much pressure is applied to the wheel 22.

Figures 5, 6:
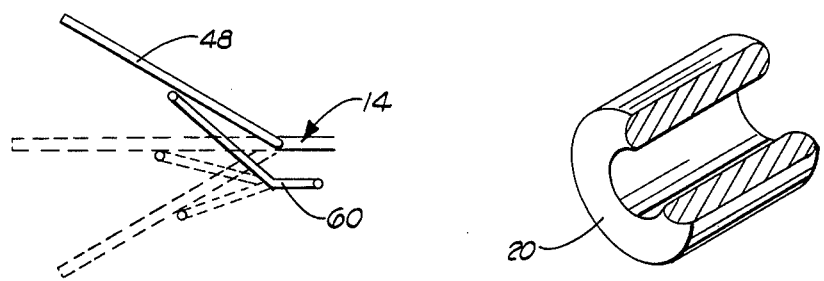
FIG. 5 illustrates a side view of individual belt sections making up the roadway belt and attached to a section arm which may be raised and lowered for depicting bumpy roads.
FIG. 6 is a perspective view of the vehicle tire.

In FIG. 5, a side view of one of the belt sections 48 is shown attached to a section arm 60. One end of the sections 48 is pivotally attached to the belt 14. The section arm 60 is attached to an electric or hydraulic drive motor which is not shown in the drawings and is pivotally attached to the belt section 48 for raising and lowering the belt section 48 on the belt 14. The belt section 48 is shown in dotted lines in a horizontal position and a lowered position. By lowering the belt section 48, a bumpy road is simulated. Also, by raising the belt section 48, the hitting of an object is simulated.

In FIG. 6, a perspective view of the deflatable tire 20 is shown to more clearly illustrate the elongated air bag type design of the tire 20 wherein the width of the tire is enlarged for engaging the width of the roadway belts 14.

In FIG. 7, a rear sectional view of the dome 18 is illustrated. It should be noted that a portion of the dome 18 is cut away to expose the vehicle 12 with the tires 20 received on the roadway belts 14. Also seen attached to the bottom of the vehicle 12 is the notocord 16. Suspended from the top of the dome 18 is a pair of wide angle lens cameras 62. In this view, the rear camera 62 hides the front camera which is disposed directly in front of the rear camera 62. The cameras 62 are suspended above the vehicle 12 and through the use of wide angle lens, display landscape 360° on a hemisphere screen 64 which makes up the interior of the dome 18. By showing roadway conditions from the cameras 62, the student driver 56 in the vehicle 12 will see roadway conditions changed both in front and in the rear of him, and he will drive the vehicle 12 in response to the changing conditions as shown on the hemisphere screen 64.

Changes may be made in the construction and arrangement of the parts or elements of the embodiment as disclosed herein without departing from the spirit or scope of the invention as defined in the following claims.

We claim:

1. A response evaluation module for teaching driver training, the module comprising:
   a vehicle having standard automotive equipment therein such as a seat, steering wheel, accelerator, brakes, speedometer, ignition, and tires;
   movable belt means constructed and adapted when mounted to receive said vehicle tires thereon, said belt means simulating a roadway;
   means mounting said belt means constructed and adapted to be driven to rotatably drive said belt means;
   a telescopeable notocord attached to the bottom of said vehicle and means stationary relative said vehicle and operable to allow movement of said vehicle forward, backward, and laterally on said belt means for simulating sliding, skidding, fish tailing, and hydroplaning; and
   a dome surrounding said vehicle and providing a hemisphere screen for showing landscape on the screen to simulate actual road traffic conditions.

2. The module as described in claim 1 wherein said belt means includes a pair of parallel roadway belts rotatably driven and receiving the tires of said vehicle thereon, the ends of said roadway belts received on belt drums, the belt drums at one end of said belts attached to an idle shaft, the belt drums at the other end of said belts attached to a drive shaft for driving said drums and said belts thereon.

3. The module as described in claim 2 wherein said roadway belts are divided into a plurality of belt sections, said belt sections pivotally attached to section arms, said section arms raising and lowering said belt sections individually on said roadway belt for simulating bumpy roads and hitting an object.

4. The module as described in claim 1 wherein said dome includes a pair of cameras suspended from the top of said dome, one of said cameras displaying landscape depicting traffic conditions in front of said vehicle, the other camera displaying landscape depicting traffic conditions at the rear of said vehicle.

5. The module as described in claim 1 wherein the tires of said vehicle are of an air bag type construction for rapid deflation so that a blow out or flat tire may be depicted during the driver training.

6. The module as described in claim 1 wherein the steering wheel of said vehicle includes pressure sensors disposed therearound and wired to the ignition of said vehicle and a computer, said pressure sensors further providing pressure readings to the computer for measuring the amount of pressure applied to the wheel during the driver training.

7. The module as described in claim 1 wherein the seat of said vehicle includes pressure sensors wired to a computer for reading pressure applied to the sensors in the seat for evaluating reaction response during the driver training.

8. A response evaluation module for teaching driver training, the module comprising:
- a vehicle having standard automotive equipment therein such as a seat, steering wheel, accelerator, brakes, speedometer, ignition, and tires;
- a pair of movable roadway belts constructed and adapted when mounted to receive the tires of said vehicle thereon for simulating the driving of the vehicle on a roadway;
- means mounting said roadway belts constructed and adapted to be driven to rotatably drive said roadway belts;
- A telescoping notocord attached to the bottom of said vehicle and to the floor beneath same, and disposed between said roadway belts and allowing movement of said vehicle on said drive belts in a forward direction, backward direction, and a lateral direction for simulating sliding of the vehicle, skidding, fish tailing, and hydroplaning;
- pressure sensors wired to a computer and attached to the steering wheel and the seat of said vehicle for measuring pressure applied thereto and comparing the amount of pressure applied during different driving situations;
- a dome surrounding said vehicle and providing a hemisphere screen; and
- a pair of cameras suspended from said dome, said cameras showing landscape on said hemisphere screen and simulating actual road traffic conditions.

* * * * *